US009862164B2

(12) United States Patent
Gray et al.

(10) Patent No.: US 9,862,164 B2
(45) Date of Patent: Jan. 9, 2018

(54) PROCESS OR SYSTEM TO REDUCE COST AND WEIGHT OF AEROSPACE INTERIOR STRUCTURAL THERMOPLASTIC OR COMPOSITE PANEL CONSTRUCTIONS

(71) Applicant: The Boeing Company, Chicago, IL (US)

(72) Inventors: Kyle L. Gray, Chicago, IL (US); Nathanial C. Cuddy, Chicago, IL (US); Harold G. Erickson, Chicago, IL (US)

(73) Assignee: The Boeing Company, Chicago, IL (US)

( * ) Notice: Subject to any disclaimer, the term of this patent is extended or adjusted under 35 U.S.C. 154(b) by 246 days.

(21) Appl. No.: 14/708,713

(22) Filed: May 11, 2015

(65) Prior Publication Data
US 2016/0332412 A1 Nov. 17, 2016

(51) Int. Cl.
| B32B 3/18 | (2006.01) |
| B32B 1/00 | (2006.01) |
| B32B 3/12 | (2006.01) |
| B64C 1/00 | (2006.01) |
| B29C 70/00 | (2006.01) |
| B32B 27/06 | (2006.01) |
| B32B 27/26 | (2006.01) |
| B32B 27/42 | (2006.01) |
| B32B 3/08 | (2006.01) |

(52) U.S. Cl.
CPC ............... *B32B 3/18* (2013.01); *B29C 70/00* (2013.01); *B32B 1/00* (2013.01); *B32B 3/08* (2013.01); *B32B 3/12* (2013.01); *B32B 27/06* (2013.01); *B32B 27/26* (2013.01); *B32B 27/42* (2013.01); *B64C 1/00* (2013.01); *B32B 2262/101* (2013.01); *B32B 2605/18* (2013.01); *B32B 2607/00* (2013.01); *B64C 2001/0072* (2013.01)

(58) Field of Classification Search
CPC ..................................................... B32B 37/18
USPC ........................................................ 428/57
See application file for complete search history.

(56) References Cited

U.S. PATENT DOCUMENTS 6,217,000 B1 * 4/2001 Younie .................. B29C 33/38
244/123.1

* cited by examiner

*Primary Examiner* — Brent O'Hern
(74) *Attorney, Agent, or Firm* — McDonnell Boehnen Hulbert & Berghoff LLP

(57) ABSTRACT

Methods for manufacturing composite panels for use in the interior of an aircraft are disclosed, specifically, methods of manufacturing joggled composite panels comprising metal inserts and the resulting composite panels and inserts.

20 Claims, 10 Drawing Sheets

PROCESS OR SYSTEM TO REDUCE COST AND WEIGHT OF AEROSPACE INTERIOR STRUCTURAL THERMOPLASTIC OR COMPOSITE PANEL CONSTRUCTIONS

TECHNICAL FIELD

The present disclosure relates generally to methods for manufacturing composite panels for use in the interior of an aircraft. Specifically, this disclosure relates to methods of manufacturing joggled composite panels comprising metal inserts and the resulting composite panels.

BACKGROUND

Composite panels are used in the interior of aircraft. One example of such a panel is a joggled panel, which includes a joggled or ramped portion. Different thicknesses of these panels are used for different interior airplane programs. Such panels may be used as dividers between class sections on an aircraft. The panels may be configured to reduce potential head strike by a passenger. These panels are typically made of aramid fiber honeycomb core material. In addition to core material known in the art, some aircrafts also use a honeycomb core that is elongated, thus allowing bending through curves. When decorative laminates are used with this elongated core, the panels may no longer comply with industry flammability requirements.

Furthermore, current manufacturing processes are very labor intensive, often causing repetitive motion issues for workers. It is also very costly to manufacture such panels via existing processes. One existing process that is particularly labor intensive involves kerf cutting, wherein a mechanic makes slices in the core in the transition areas between the straight and joggled portions. This process often results in panels of inconsistent quality and increases the handling time required to manufacture the panels. This process does eliminate the need for the elongated core, thus the panel is able to meet flammability requirements, but it is time consuming and thus, expensive. Thus, there is a need for a process of manufacturing composite panels which is labor and cost effective.

SUMMARY

According to an exemplary example, a method for manufacturing a composite panel is provided. The method comprises providing a first layer on a tool, wherein the tool is adapted to receive a plurality of pins; inserting the plurality of pins into the tool; positioning a plurality of inserts on the first layer, wherein the plurality of inserts are adapted to connect to the plurality of pins; connecting the plurality of inserts to the pins; positioning a plurality of core portions adjacent to the plurality of inserts; providing a second layer on the plurality of core portions in order to form a non-cured composite panel; positioning a plate on the non-cured composite panel; curing the non-cured composite panel in order to form a non-trimmed composite panel; and trimming excess material from the non-trimmed composite panel to form the composite panel.

In another example, a composite panel is provided. The composite panel comprises a first layer; a plurality of core portions; a plurality of inserts; and a second layer. The plurality of inserts are bonded to the plurality of core portions.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the examples are set forth in the appended claims. The examples, as well as modes of use, further objectives and descriptions thereof, will best be understood by reference to the following detailed description of an example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

The present disclosure relates to a method of manufacturing a composite panel. The composite panel may be a panel for use in the interior of an airplane to separate classes on the airplane. It may be a headstrike or joggle panel. The method includes pinning inserts to the panel, which enables the parts to stay better positioned in their chosen location on the tool. The inserts may be formed by extrusion or any other method known in the art. For example, the inserts may be formed in separated pieces and welded or bonded together. The inserts may comprise metal and/or non-metal material. The time for preparation of the surface after curing is also reduced. The resulting structure meets the Federal Aviation Administration ("FAA") regulatory flammability requirements for interior components.

The core portions of the panel may comprise a honeycomb core material, such as hexagonal aramid honeycomb material. Other types of core material may also be used, such as aluminum core, fiberglass core, Nomex® core, and others known in the art. The pinning method of the present disclosure allows for better bonding of the metal inserts and the core material.

The pinning of the metal inserts to the panel enables the parts to stay better positioned in the chosen location on the tooling. This aids the mechanics during the construction of the whole panel. The material, for example, aluminum, interfaces with the core cell. A slot at both ends of the insert allows for thermal expansion of the metal during the curing process. The aluminum is used in the curved portion of the panel to meet the FAA regulatory flammability constraints, in addition to providing structural support. The pinning process enables the mechanics to force the core material closer to the aluminum insert, giving a better (closer) bond. The pinning process also results in a quality surface finish that subsequently reduces the post cure surface preparation effort (the time required to apply and sand plastic filler).

In alternative examples, the inserts may comprise non-metal material, such as thermoset or thermoplastic or composite material. In other examples, the inserts may comprise both metal and non-metal material. Any FAA compliant material may be used.

Figure 1:
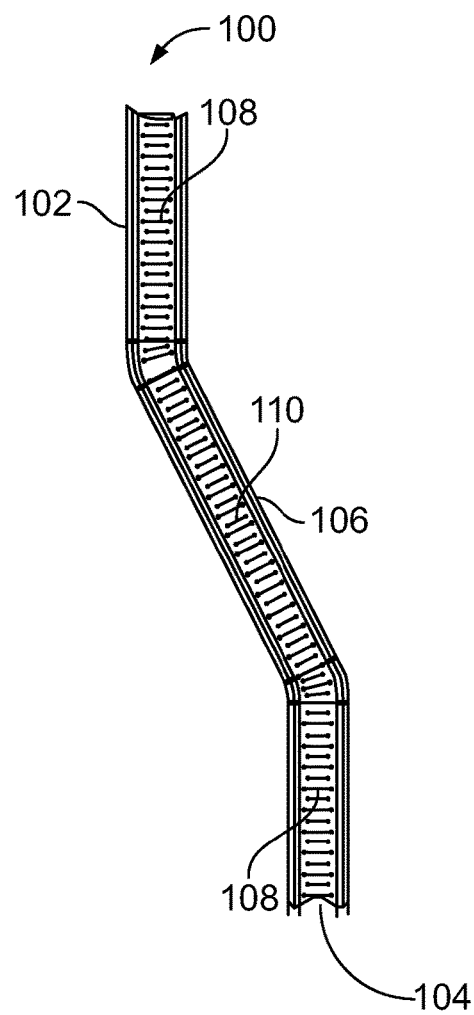
FIG. 1 is a diagrammic representation of a side view of a prior art joggled composite panel.

FIG. 1 shows a prior art joggled composite panel 100 comprising a first layer 102, core material 104, and a second layer 106. The first layer 102 and the second layer 106 may be laminate material, such as aramid fiber laminate material. The core material 104 is disposed between the first layer 102 and the second layer 106. The core material may comprise both over expanded aramid honeycomb ("OX") core 108 and symmetrical aramid honeycomb core 110. Use of the OX core 108 allows bending through curves. As discussed above, use of the OX core 108 with some decorative laminates may produce higher than allowed flammability data.

Figure 2:
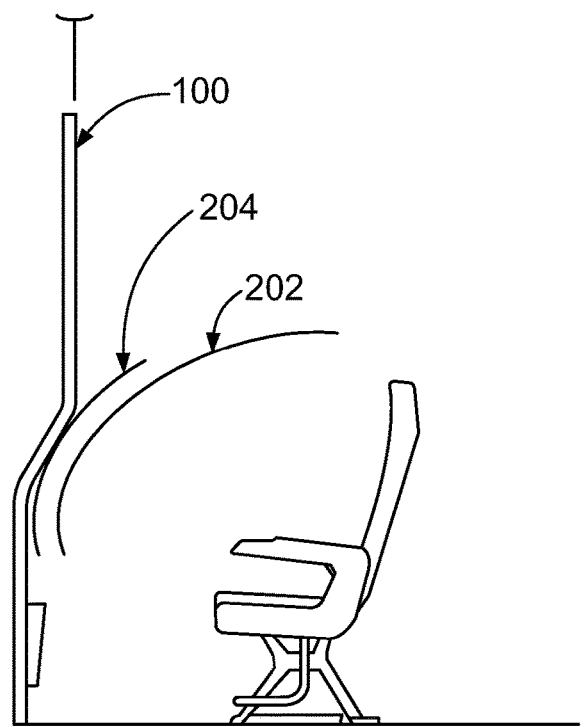
FIG. 2 is a diagrammic representation of a portion of the interior of an aircraft including a joggled composite panel.

Panel 100 could be used as a partition in an aircraft, as shown in FIG. 2. The joggled panel 100 may reduce the risk of head strike. Average head strike path 202 and worst case head strike path 204 are shown, illustrating how panel 100 is arranged to reduce head strike.

Figure 3:
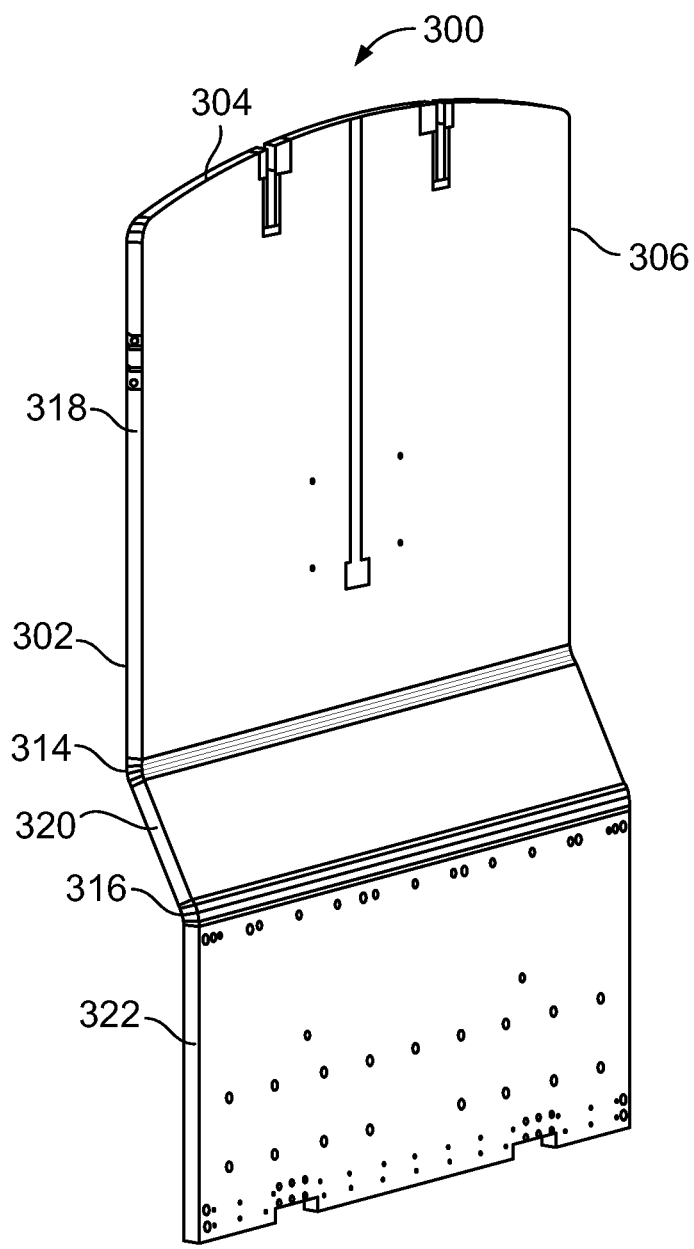
FIG. 3 is a diagrammic representation of a joggled composite panel in accordance with an example.

In order to eliminate the use of OX core, metal inserts may be used to manufacture a composite panel, such as a joggled composite panel. FIG. 3 shows a joggled composite panel 300, in accordance with an exemplary example. Composite panel 300 may also be used in an aircraft, as shown in FIG. 2. Composite panel 300 may comprise a first layer 302, core material 304, and a second layer 306. Composite panel 300 may also comprise a plurality of inserts, such as first insert 314 and second insert 316 at the joints, thus eliminating the need for OX core. The core material 304 may be divided into a plurality of core portions, such as a first core portion 318, a second core portion 320, and a third core portion 322. The first core portion 318 may be positioned adjacent to the first insert 314, the second core portion 320 may be positioned in between the first insert 314 and the second insert 316, and the third core portion 322 may be positioned adjacent to the second insert 316.

Figure 4:
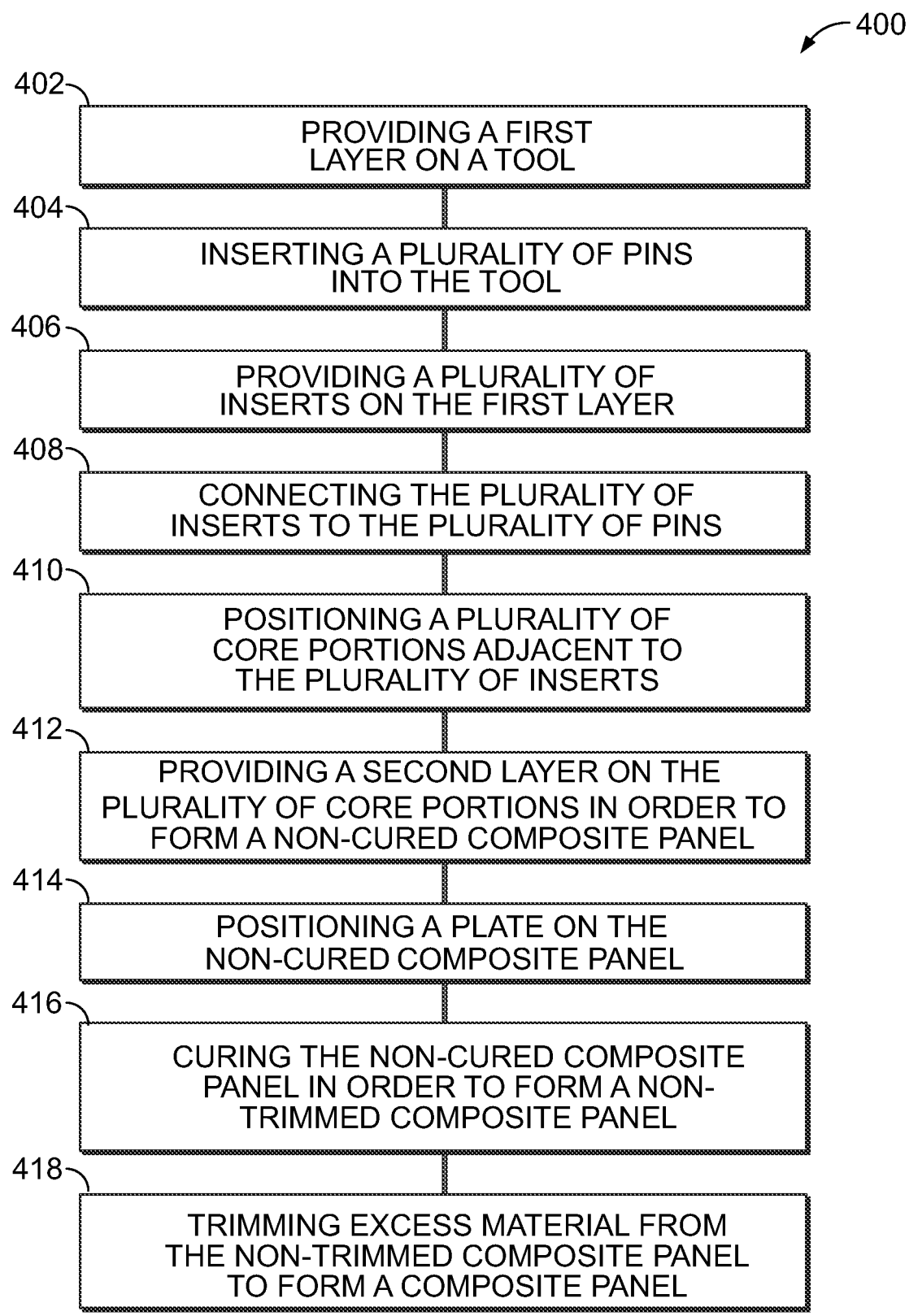
FIG. 4 is a diagrammic representation of a method for manufacturing a composite panel in accordance with an example.

FIG. 4 illustrates a method 400 for manufacturing a composite panel 300. The method comprises providing a first layer on a tool (402). The tool is adapted to receive a plurality of pins. The method 400 further comprises inserting the plurality of pins into the tool (404) and positioning a plurality of inserts on the first layer (406). The plurality of inserts are adapted to connect to the plurality of pins. In an alternative example, the plurality of pins may be inserted into the plurality of inserts and the tool after the plurality of inserts are positioned. The method 400 next comprises connecting the plurality of inserts to the plurality of pins (408), positioning a plurality of core portions adjacent to the plurality of inserts (410), providing a second layer on the plurality of core portions in order to form a non-cured composite panel (412), positioning a plate on the non-cured composite panel (414), curing the non-cured composite panel in order to form a non-trimmed composite panel (416), and trimming excess material from the non-trimmed composite panel to form the composite panel 300 (416). The method 400 is described in more detail below.

Figure 5A:
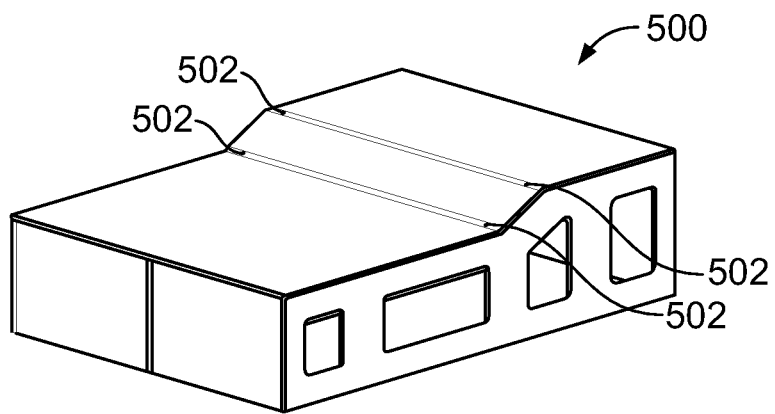
FIGS. 5a, 5b, and 5c are diagrammic representations of a tool for use in accordance with an example.
Figure 5B:
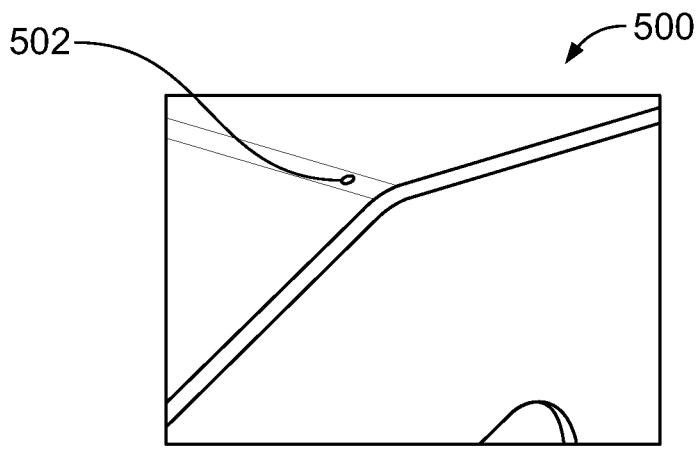
Figure 5C:
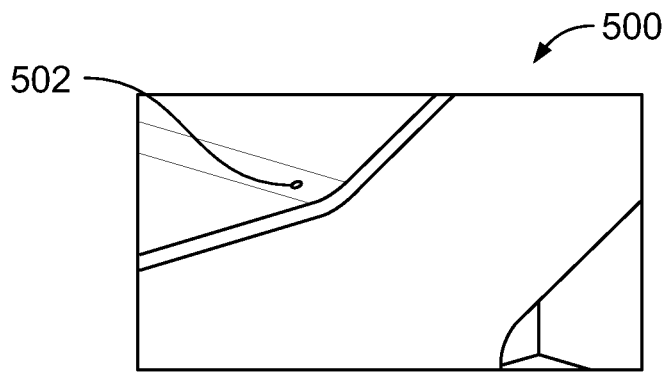
Figure 6:
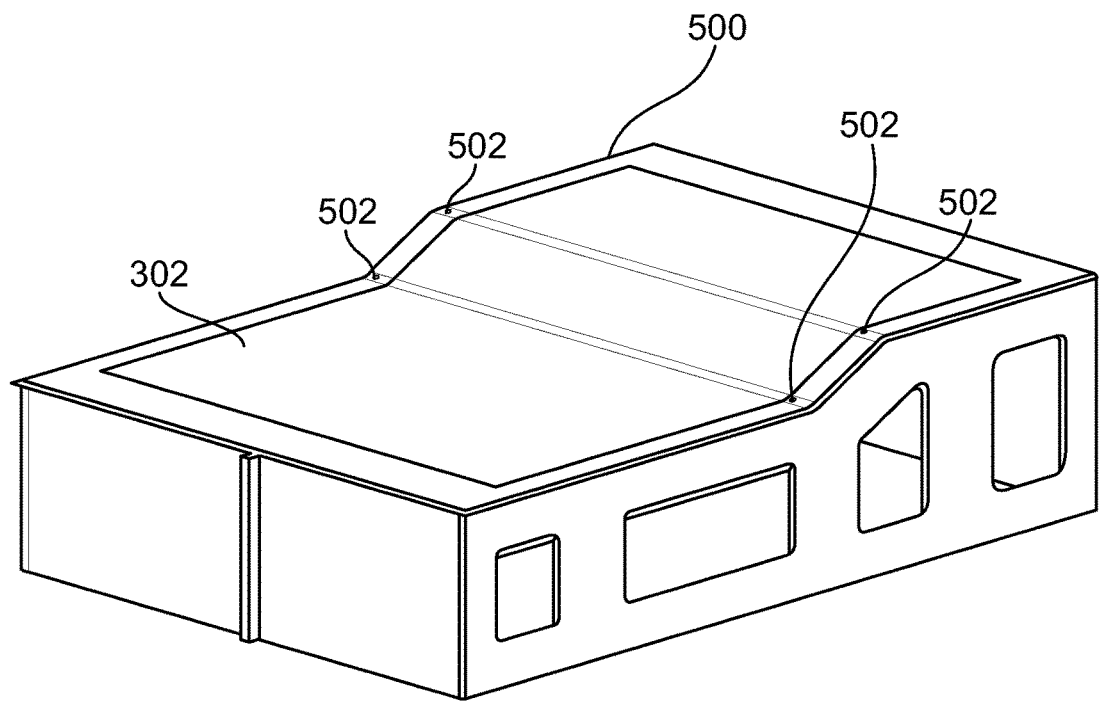
FIG. 6 is a diagrammic representation of a layer of a laminate on a tool in accordance with an example.
Figure 7A:
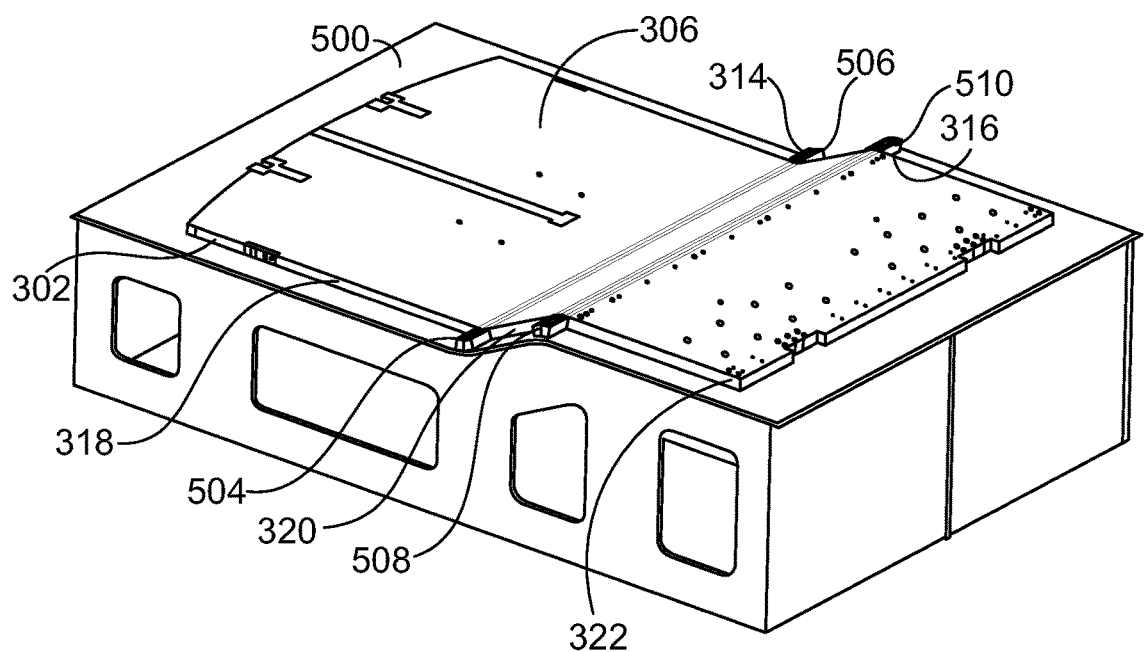
FIGS. 7a, 7b, and 7c are diagrammic representations of a tool, inserts, and a joggled composite panel in accordance with an example.
Figure 7B:
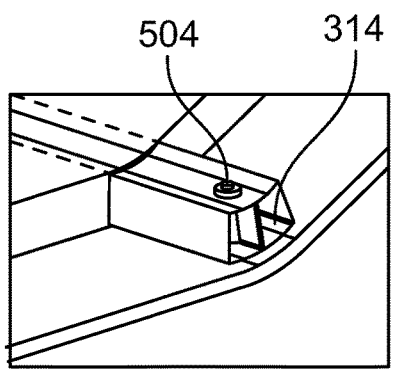
Figure 7C:
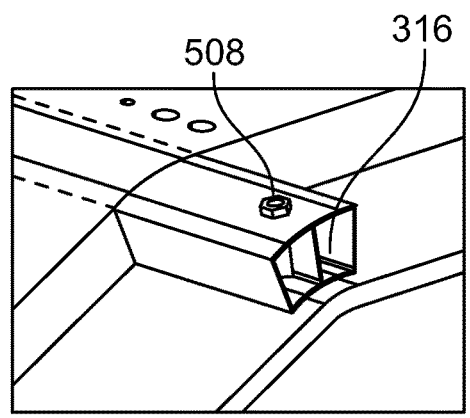
Figure 8A:
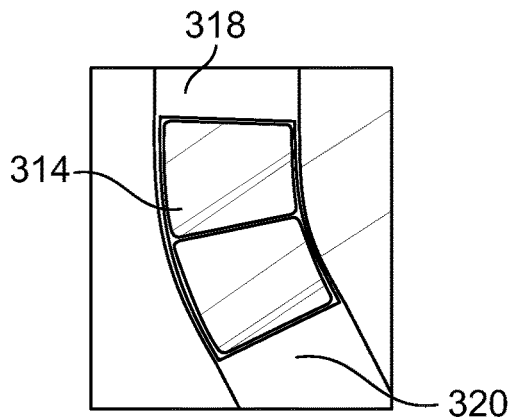
FIGS. 8a, 8b, 8c, 8d, and 8e are diagrammic representations of inserts in accordance with an example.
Figure 8B:
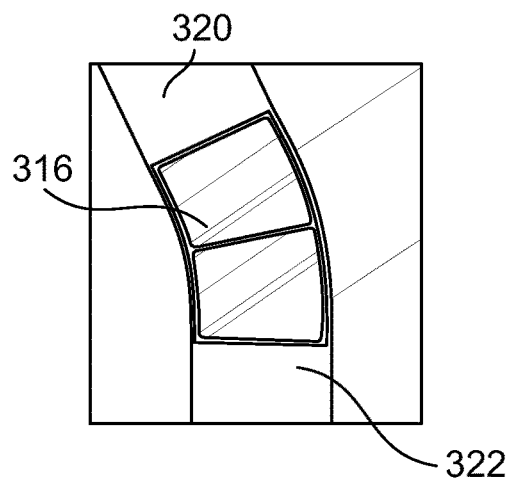
Figure 8C:
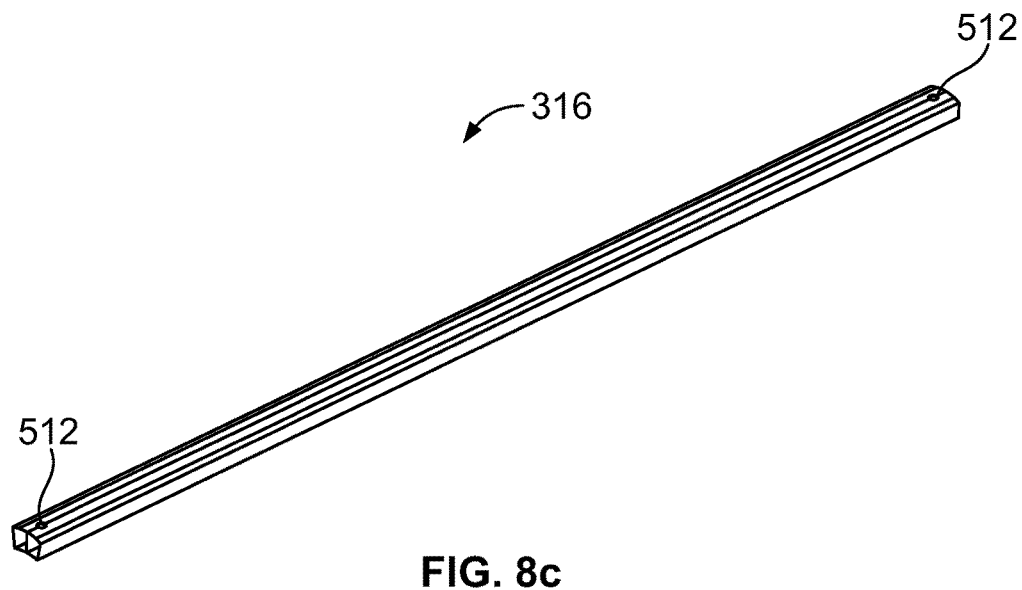
Figure 8D:
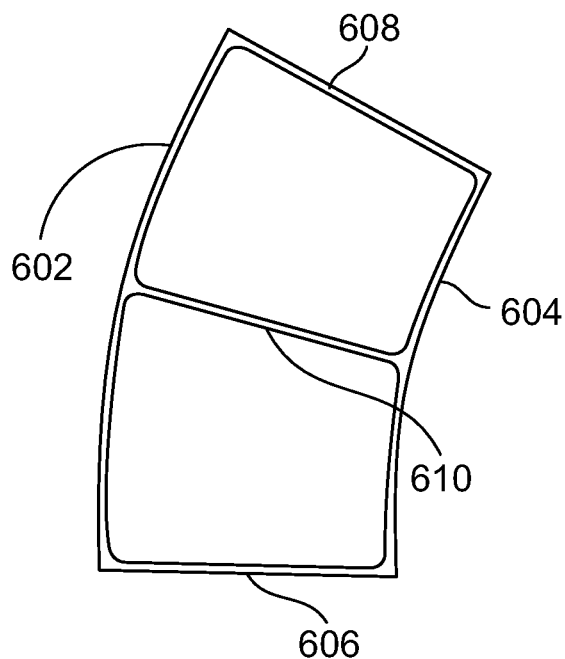
Figure 8E:
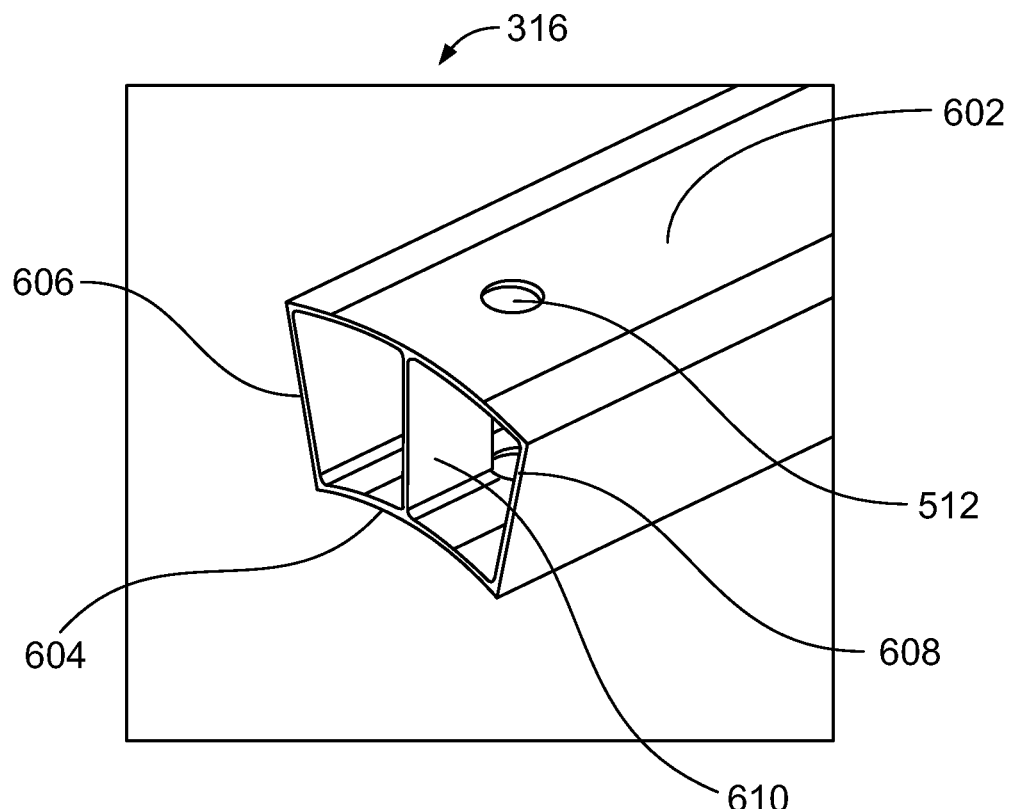

A tool 500 for use in method 400 is shown in FIGS. 5a, 5b, and 5c. Tool 500 may include a plurality of holes 502 adapted to receive a plurality of pins. FIG. 6 shows the tool 500 with the first layer 302 positioned on top of tool 500. The first layer 302 may comprise laminate material, such as a fiberglass, thermoplastic, or phenolic sheet material. After the first layer 302 is positioned on top of tool 500, a plurality of inserts are positioned on top of first layer 302. The inserts may be metal inserts, for example, aluminum. The plurality of inserts may comprise the first insert 314 and the second insert 316. The plurality of inserts may be adapted to connect to a plurality of pins. For example, the plurality of pins may comprise a first pin 504, a second pin 506, a third pin 508, and a fourth pin 510. The first insert 314 may be connected to the first pin 504 and the second pin 506. The second insert 316 may be connected to the third pin 508 and the fourth pin 510, as shown in FIGS. 7a, 7b, and 7c.

A plurality of core portions may be positioned adjacent to the inserts. In an example, the plurality of core portions may comprise the first core portion 318, the second core portion 320, and the third core portion 322. The first core portion 318 may be positioned adjacent to the first insert 314, the second core portion 320 may be positioned in between the first insert 314 and the second insert 316, and the third core portion 322 may be positioned adjacent to the second insert 316. The plurality of core portions may bond to the plurality of inserts during the curing step. A second layer 306 may be positioned on the plurality of core portions in order to form a non-cured composite panel. The second layer 306 may comprise laminate material, such as a fiberglass, thermoplastic, or phenolic sheet material.

FIGS. 8a, 8b, 8c, 8d, and 8e show detailed illustrations of inserts 314/316, in accordance with exemplary examples. Inserts 314/316 may be manufactured through an extrusion process. Inserts 314/316 may be in a curved configuration, such that the inserts assist in forming the joggled composite panel 300. Inserts 314/316 may include a top portion 602 and a bottom portion 604. The top portion 602 may be longer than the bottom portion 604, thus allowing for the curved configuration. Inserts 314/316 may also comprise a first side portion 606 and a second side portion 608, which connect the top portion 602 to the bottom portion 604. A middle portion 610 may be arranged between first side portion 606 and second side portion 608 and may be connected to top portion 602 and bottom portion 604 in order to form two approximately equal sized openings. Middle portion 610 may extend the length of the insert and provide support to prevent the insert from collapsing during the curing process. Top portion 602 and bottom portion 604 may include insert pin holes 512. Inserts 314/316 may be formed by extrusion or any other method known in the art.

Figure 9A:
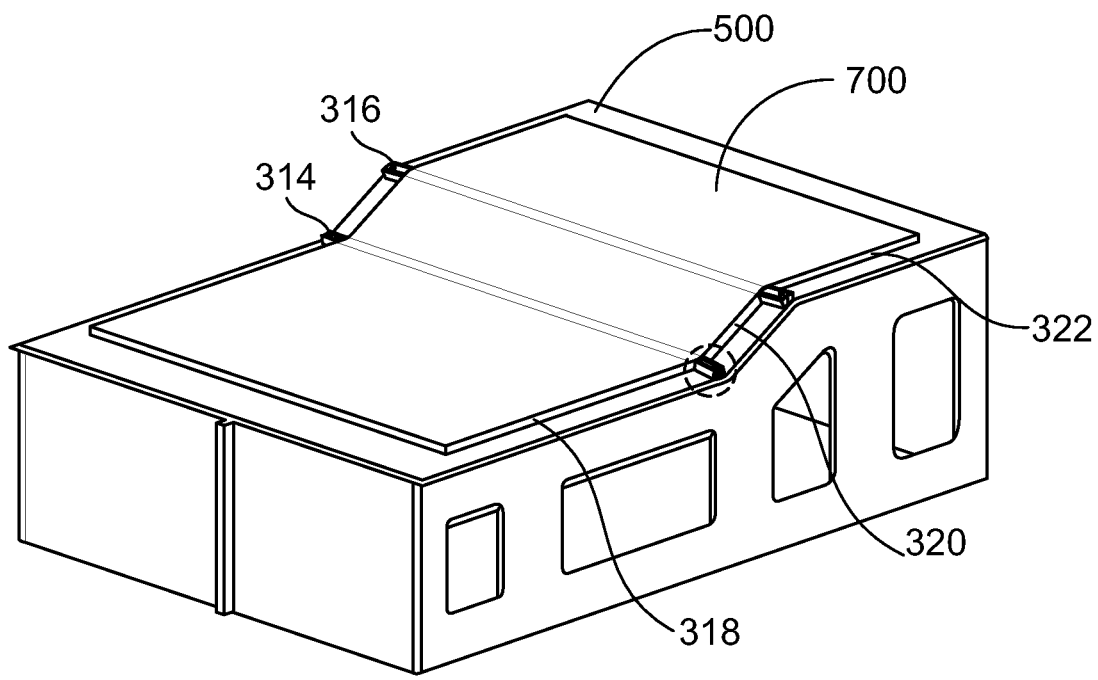
FIGS. 9a and 9b are diagrammic representations of a tool, inserts, a joggled composite panel, and a plate in accordance with an example.
Figure 9B:
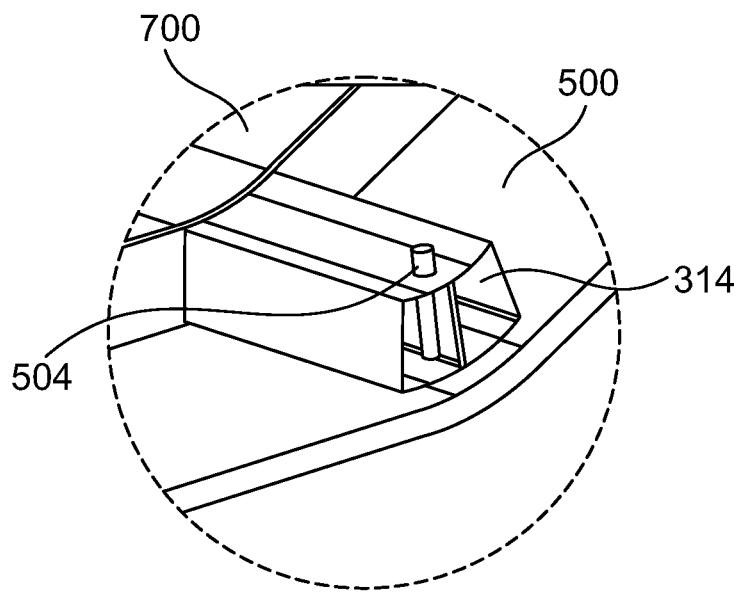

After the second layer 306 is positioned on the plurality of core portions, a plate 700, such as a caul plate, may be positioned on top of the non-cured composite panel in order to transmit even pressure to the non-cured composite panel and thus provide a smooth and exact contoured surface, as shown in FIGS. 9a and 9b. The plate may be reused. After the plate is placed on the non-cured composite panel, the panel is cured at heat and pressure to produce an untrimmed composite panel 324. In an exemplary example, the plate is not positioned on top of the composite panel, but is not pinned to the tool 500. In other examples, the plate may be pinned to the tool 500.

Figure 10:
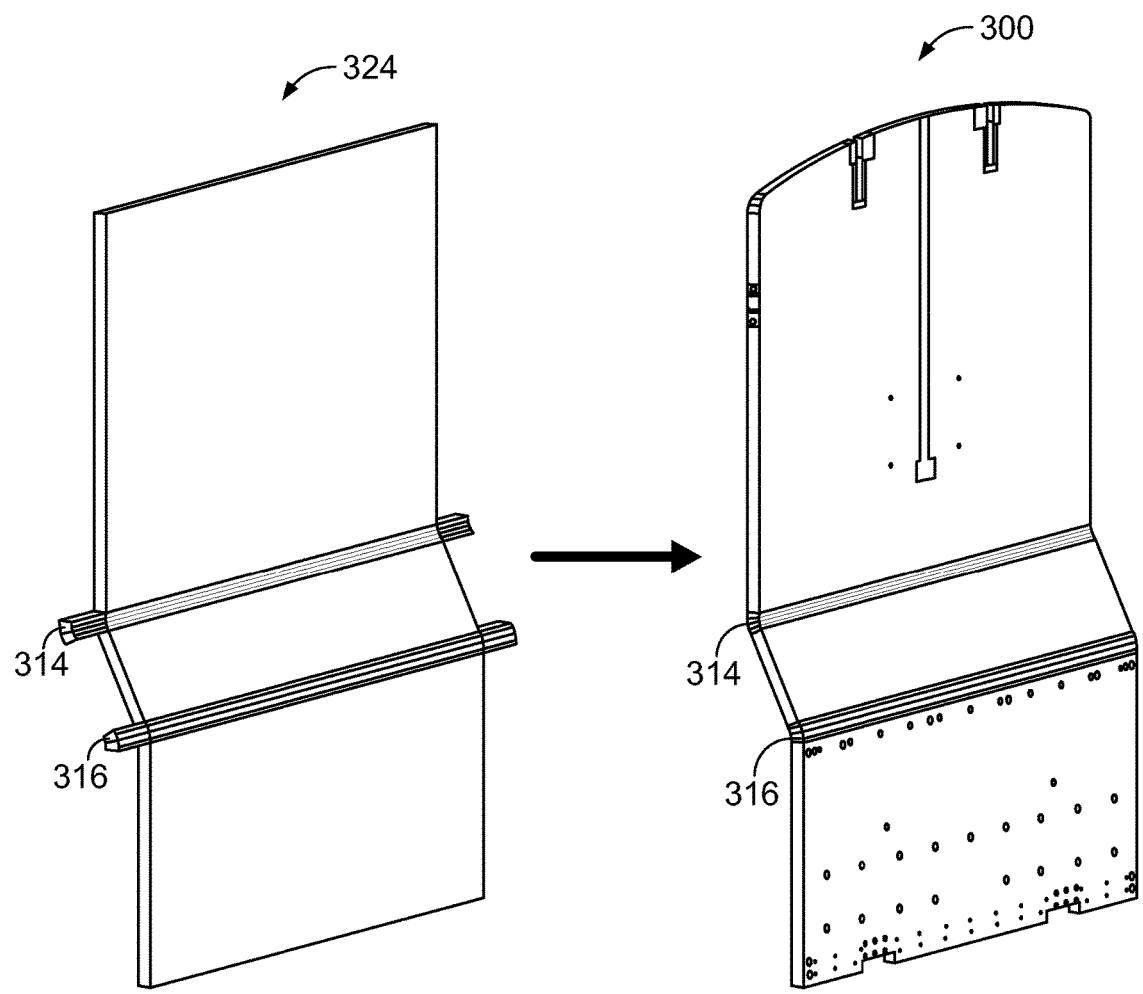
FIG. 10 is a diagrammic representation of joggled composite panels in accordance with an example.

After the panel is cured, the plurality of inserts 314/316 may be trimmed from the untrimmed composite panel 324 such that they are flush with the sides of the panel, as shown in FIG. 10. The resulting composite panel 300 comprises the first layer 302, the first core portion 318, the second core portion 320, the third core portion 322, the first insert 314, the second insert 316, and the second layer 306. The plurality of inserts 314/316 are bonded to the plurality of core portions 318, 320, and 322.

In an exemplary example, the composite panel 300 may be a joggled composite panel. The first insert 314, the second core portion 320, and the second insert 316 may comprise the joggled portion of the joggled composite panel. In other examples, the composite panel 300 may comprise different configurations of the plurality of core portions and plurality of inserts. For example, the plurality of core portions and the plurality of inserts may be arranged such that a straight panel is formed.

Figure 11:
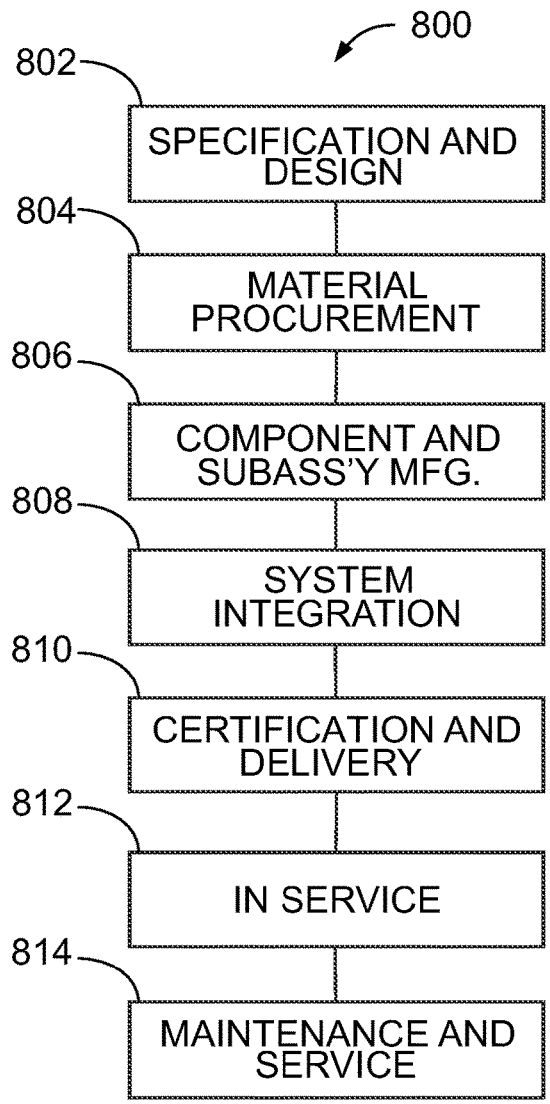
FIG. 11 is a diagrammic representation of a block diagram of an aircraft manufacturing and service method in accordance with an example.
Figure 12:
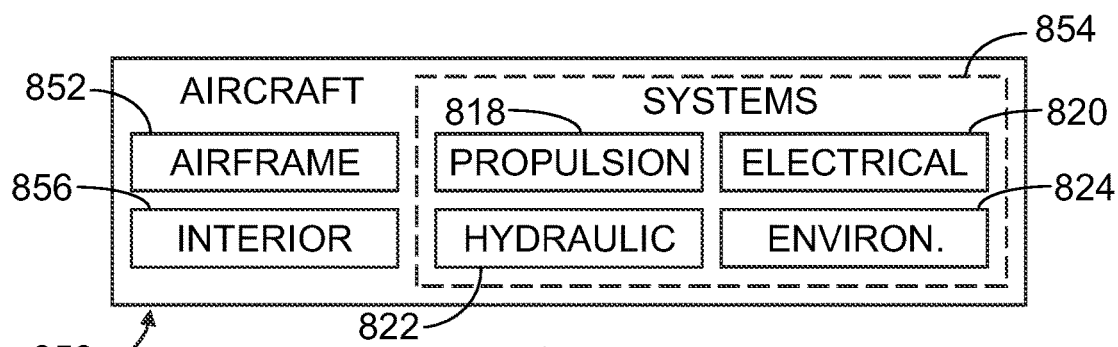
FIG. 12 is a diagrammic representation of a block diagram of an aircraft in which an example may be implemented.

Examples of the disclosure may be described in the context of an aircraft manufacturing and service method 800 as shown in FIG. 11 and an aircraft 850 as shown in FIG. 12. Turning first to FIG. 11, an illustration of an aircraft manufacturing and service method is depicted in accordance with an example. During pre-production, exemplary method 800 may include specification and design step 802 of the aircraft 850 in FIG. 12 and material procurement step 804. For example, a composite panel 300 as disclosed herein may be designed during this step 802.

During production, component and subassembly manufacturing step 806 and system integration step 808 of the aircraft 850 in FIG. 12 takes place. Thereafter, the aircraft 850 in FIG. 12 may go through certification and delivery step 810 in order to be placed in service step 812. While in service by a customer, the aircraft 850 in FIG. 12 is scheduled for routine maintenance and service step 814 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

With reference now to FIG. 12, an illustration of an aircraft 850 is depicted in which an example may be implemented. In this example the aircraft 850 produced by exemplary method 800 in FIG. 11 and may include an airframe 852 with a plurality of high-level systems 854 and an interior 856. Examples of high-level systems 854 include one or more of a propulsion system 818, an electrical system 820, a hydraulic system 822, and an environmental system 824. In an example, the method 400 and composite panel 300 of the present disclosure may be used in interior 856. Any number of other systems may be included. Although an aerospace example is shown, the principles of the disclosure may be applied to other industries, such as the automotive industry.

Systems and methods embodied herein may be employed during any one or more of the stages of the production and service method 800 in FIG. 11. For example, components or subassemblies corresponding to production step 806 may be fabricated or manufactured in a manner similar to components or subassemblies produced while the aircraft 850 is in service. Also, one or more apparatus examples, method examples, or a combination thereof may be utilized during the production step 806 and certification and delivery step 810, for example, by expediting assembly of or reducing the cost of an aircraft 850. Similarly, one or more of apparatus examples, method examples, or a combination thereof may be utilized while the aircraft 850 is in service, for example and without limitation, to maintenance and service 814.

The foregoing description of the specific examples will reveal the general nature of the disclosure so others can, by applying current knowledge, readily modify and/or adapt for various applications such specific examples without departing from the generic concept, and therefore such adaptations and modifications are intended to be comprehended within the meaning and range of equivalents of the disclosed examples. It is to be understood that the phraseology or terminology herein is for the purpose of description and not of limitation.

What is claimed:

1. A method for manufacturing a composite panel, the method comprising:
   providing a first layer on a tool, wherein the tool is adapted to receive a plurality of pins;
   inserting the plurality of pins into the tool;
   positioning a plurality of inserts on the first layer, wherein the plurality of inserts are adapted to connect to the plurality of pins;
   connecting the plurality of inserts to the pins;
   positioning a plurality of core portions adjacent to the plurality of inserts;
   providing a second layer on the plurality of core portions in order to form a non-cured composite panel;
   positioning a plate on the non-cured composite panel; and
   curing the non-cured composite panel in order to form a composite panel.

2. The method of claim 1, wherein the plurality of inserts comprise a metal.

3. The method of claim 2, wherein the plurality of inserts comprise aluminum.

4. The method of claim 1, wherein the plurality of inserts comprises a first insert and a second insert.

5. The method of claim 4, wherein the plurality of pins comprises a first pin, a second pin, a third pin, and a fourth pin.

6. The method of claim 5, further comprising connecting the first insert to the tool with the first pin and the second pin and connecting the second insert to the tool with the third pin and the fourth pin.

7. The method of claim 6, wherein the plurality of core portions comprises a first core portion, a second core portion, and a third core portion.

8. The method of claim 7, further comprising positioning the first core portion adjacent to the first insert; positioning the second core portion in between the first insert and the second insert; and positioning the third core portion adjacent to the second insert.

9. The method of claim 1, wherein the plurality of core portions bond to the plurality of inserts during curing.

10. The method of claim 8, wherein the composite panel is a joggled composite panel.

11. The method of claim 10, wherein the first insert, the second core portion, and the second insert form a joggled portion of the joggled composite panel.

12. A composite panel manufactured according to the method of claim 1.

13. The composite panel of claim 12, wherein the plurality of inserts comprise a metal.

14. The composite panel of claim 13, wherein the plurality of inserts comprise aluminum.

15. The composite panel of claim 12, wherein the plurality of inserts comprise a first insert and a second insert.

16. The composite panel of claim 15, wherein the plurality of core portions comprise a first core portion, a second core portion, and a third core portion.

17. The composite panel of claim 16, wherein the first insert, the second core portion, and the second insert form a joggled portion.

18. The composite panel of claim 12, wherein the plurality of core portions comprise honeycomb core material.

19. The composite panel of claim 12, wherein the first layer and the second layer comprise laminate material.

20. An insert for use in the composite panel of claim 12, the insert comprising a top portion, a bottom portion, a first side portion, a second side portion, a middle portion, and a plurality of insert pin holes,
   wherein the top portion is longer than the bottom portion, and
   wherein the middle portion is arranged between the first side portion and the second side portion in order to form two openings.

\* \* \* \* \*